J. G. HARTMAN.
BOX HANDLING DEVICE.
APPLICATION FILED MAY 31, 1919.
1,386,929.
Patented Aug. 9, 1921.
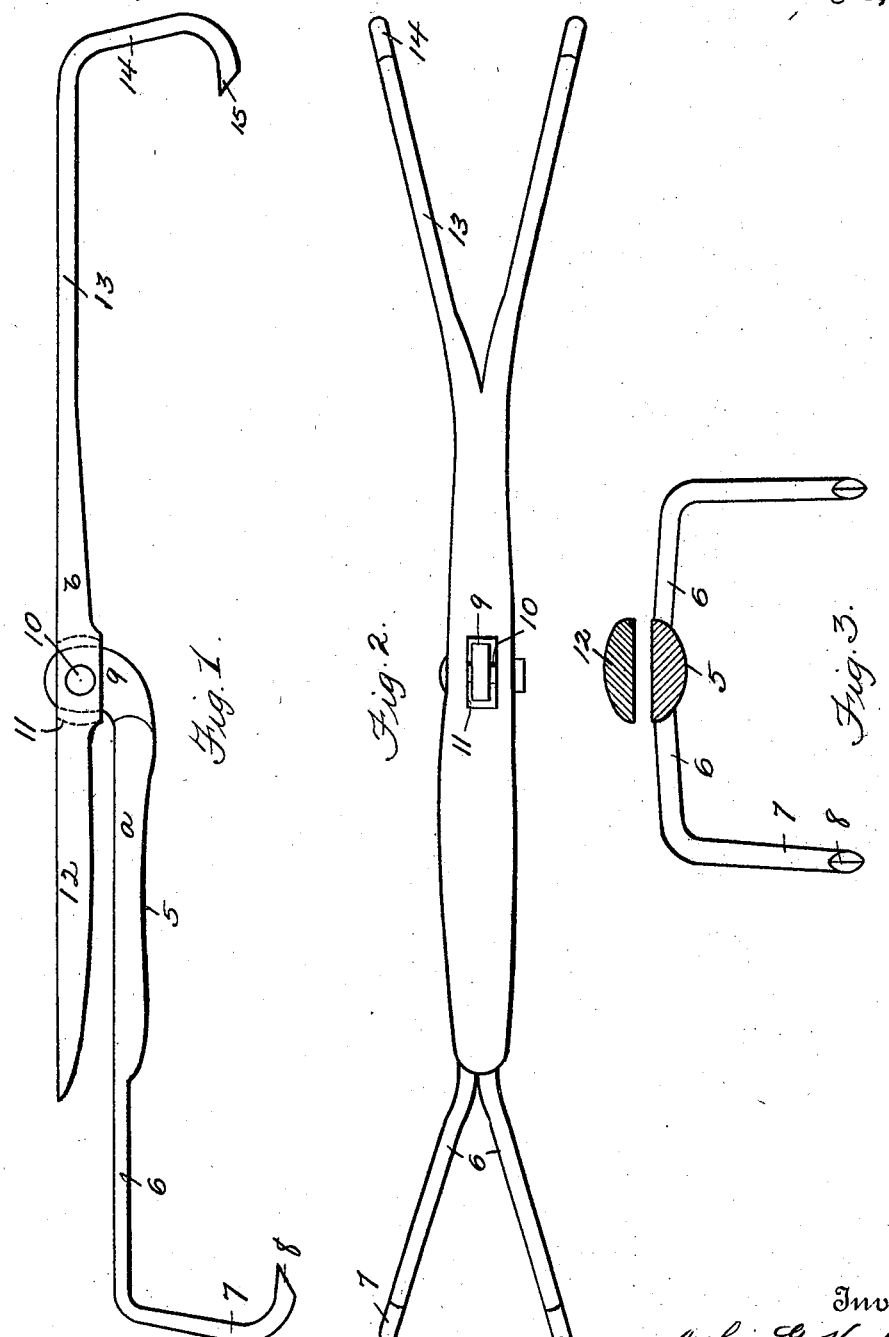
Witnesses
Inventor
John G. Hartman
By Samuel Herrick
Attorney

UNITED STATES PATENT OFFICE.

JOHN G. HARTMAN, OF YAKIMA, WASHINGTON.

BOX-HANDLING DEVICE.

1,386,929.        Specification of Letters Patent.        Patented Aug. 9, 1921.

Application filed May 31, 1919. Serial No. 300,872.

*To all whom it may concern:*

Be it known that I, JOHN G. HARTMAN, a citizen of the United States of America, residing at Yakima, in the county of Yakima and State of Washington, have invented certain new and useful Improvements in Box-Handling Devices, of which the following is a specification.

This invention relates to box handling devices and more particularly to a box lifting device intended for use in handling fruit boxes. The object of the invention is to provide an improved device of this character constructed in such manner that it may be very quickly and easily engaged with a box of fruit or disengaged therefrom, and when engaged with the box will securely hold the same so that the box may be lifted and carried from place to place. The device forming the subject matter of the present invention provides a structure whereby much of the labor incident to removing boxes of fruit from the orchard may be eliminated.

Further objects and advantages of the invention will be set forth in the detailed description which now follows. In the accompanying drawing Figure 1 is a side elevation of a box handling device constructed in accordance with the invention, Fig. 2 is a plan view thereof, and Fig. 3 is a vertical sectional view upon line *a—a* of Fig. 1.

Like numerals designate corresponding parts throughout the several views.

Referring to the drawing it will be seen that my improved device comprises two members *a* and *b*. The member *a* is rounded upon its under side to constitute a handle portion 5, from one end of which divergent arms 6 extend. These arms are downturned at 7 and are provided with inwardly directed hooks 8 adapted to engage beneath a cleat as is commonly found upon the end of fruit boxes. However these hooks are pointed to adapt them to engage boxes or other objects having no cleats, and it is to be understood that the invention is not limited to the handling of boxes but is adapted to handle crates, baskets, or other packages within certain limits of size. At its inner end the handle 5 is provided with an upturned extension 9 which enters and is pivoted at 10 within a slot 11 formed in the member *b*. This member *b* is provided with a handle 12 which projects over the handle 5 and lies in substantial parallelism therewith when the device is in released position. At its end remote from the handle 12, the member *b* is forked as indicated at 13 and these forked portions are extended downwardly at 14 and are provided with inwardly directed hooks 15 corresponding to the hooks 8.

The method of use of the device is as follows: By grasping the handles 5 and 12 within the hand and pressing these handles together the hooks 8 and 15 will be caused to move away from each other to thereby permit of the device being positioned with respect to the package to be engaged. The operator thereupon lifts the structure by pulling upwardly upon the handle 5 but at the same time releasing his grasp upon the handle 12. This causes the parts *a* and *b* to tend to move to an angular position with respect to each other and this in turn causes the hooks 8 and 15 to move toward each other, enough to securely engage the package, and it is apparent that the greater the weight the more these hooks tend to move into engagement with the package.

It is to be understood that the invention is not limited to the precise construction set forth but that it includes within its purview whatever changes fairly come within the spirit of the appended claim.

Having described my invention what I claim is—

In a device of the character described a pair of members each having divergent arms at their ends which terminate in downwardly directed portions, each downwardly directed portion having an inturned sharply pointed prong at its extremity adapted to penetrate the wood of wooden receptacles, the inner portions of said members being enlarged and one of said members having a short upturned ear at its inner end which enters and is pivoted in a recess formed in the other of said members at a point spaced from the inner end of the latter whereby the latter member is caused to overlap the upper face of the inner portions of the other of said members, the upper and lower faces of said overlapping portions of the respective members being rounded to complementally form a hand grasp and lying so closely together as to permit of their being grasped within the hand, the divergent arms of the respective members lying upon opposite sides of the longitudinal center of the device whereby the said prongs are caused to resist any tendency of the load to tip.

In testimony whereof I affix my signature in the presence of two witnesses.

JOHN G. HARTMAN.

Witnesses:
ELEANORA BARTEL,
HENRY H. WENDE.